United States Patent [19]
Nilssen

[11] Patent Number: 4,675,576
[45] Date of Patent: Jun. 23, 1987

[54] HIGH-RELIABILITY HIGH-EFFICIENCY ELECTRONIC BALLAST

[76] Inventor: Ole K. Nilssen, Caesar Dr., Rte. 5, Barrington, Ill. 60010

[21] Appl. No.: 720,386

[22] Filed: Apr. 5, 1985

[51] Int. Cl.[4] ............ H05B 37/00; H05B 39/00; H05B 41/14
[52] U.S. Cl. .................. 315/242; 315/DIG. 5; 315/DIG. 7; 315/232; 361/42; 361/45; 363/50; 363/56
[58] Field of Search ............ 315/DIG. 5, DIG. 7, 315/206, 240, 307, 232, 241, 242, 209, 244, 225; 361/42, 45, 46; 363/50, 56

[56] References Cited

U.S. PATENT DOCUMENTS

| | | | |
|---|---|---|---|
| 3,506,906 | 4/1970 | Nestor | 361/45 |
| 4,277,726 | 7/1981 | Burke | 315/307 |
| 4,507,698 | 3/1985 | Nilssen | 361/45 |
| 4,523,131 | 6/1985 | Zansky | 315/DIG. 7 |
| 4,563,719 | 1/1986 | Nilssen | 361/42 |
| 4,613,934 | 9/1986 | Pacholok | 315/DIG. 7 |

Primary Examiner—Saxfield Chatmon

[57] ABSTRACT

An electronic ballast is adapted for operation on regular 120 volt/60 Hz power line voltage and comprises: (i) full bridge rectifier means, (ii) ripple filter means consisting of an LC circuit series-resonant at 120 Hz, (iii) self-oscillating inverter means operating into an LC output circuit parallel-resonant at about 30 kHz, and (iv) means to disable the inverter in case a 30 kHz ground-fault current flows from its output circuit. A key element in achieving high reliability as well as high durability relates to the use of the series-resonant LC circuit instead of the conventional electrolytic capacitor for DC voltage ripple filtering. A key element in achieving high efficiency relates to the use of ground-fault interruption to achieve the required safety from electric shock hazard, thereby obviating the need for the more conventionally used isolation transformer with its attendant added cost and inefficiency.

13 Claims, 2 Drawing Figures

HIGH-RELIABILITY HIGH-EFFICIENCY ELECTRONIC BALLAST

BACKGROUND OF THE INVENTION

1. Field of Invention

The present invention relates to electronic inverter-type ballasts adapted for operation on ordinary electric utility power lines and operable to power fluorescent lamps.

2. Prior Art and Underlying Rationale

Two major issues associated with electronic ballasts for fluorescent lamps relate to reliability and efficiency.

Reliability has become an issue as a result of widespread field experience to the effect that most presently available electronic ballasts are either unreliable, short-lived, or both.

Efficiency is an issue in the sense that the very reason for using electronic ballasts in the first place involves the attainment of significantly improved overall efficiency—and every percentage-point of efficiency improvement is economically significant. However, in the most common of all applications, namely in powering more-or-less ordinary 48" bi-pin fluorescent lamps, efficiency improvements attained by electronic ballasts can vary from a low of under 10% to a high of over 25%—with most electronic ballasts exhibiting efficiencies well below the maximally attainable level.

Two important reasons underlying limited reliability and durability of an electronic ballast relate to: (i) the use of an electrolytic capacitor for filtering the DC voltage, thereby introducing all the life-durability problems associated with such capacitors when used in high temperature environments—especially under conditions of having to handle exceptionally large ripple currents; and (ii) the use of an inverter circuit that is overly sensitive to voltage transients, thereby giving rise to high probabilities of precipitous inverter failures.

Two factors importantly limiting the attainment of maximum efficiency relate to: (i) the use in the ballast output circuit of an isolation transformer in order to meet the required standards for shock hazard safety; and (ii) the use of unfiltered DC voltage to supply the inverter, which—although eliminating any problems with the use of electrolytic capacitors—results in a strongly amplitude modulated high frequency current being provided to the fluorescent lamp, thereby causing this lamp to operate with reduced efficiency.

Exacerbating the problem of attaining maximum efficiency is the mandatory requirement that the ballast draw power from the power line with a high power factor.

SUMMARY OF THE INVENTION

BRIEF DESCRIPTION

In its preferred embodiment, subject invention comprises a full-wave rectifier connected with an ordinary 120 Volt/60 Hz power line. An LC circuit series-resonant at 120 Hz is connected directly across the rectifier's output terminals, thereby eliminating 120 Hz ripple as well as providing for an excellent power factor in respect to the power drawn by the rectifier from the power line.

The DC voltage from the rectifier-filter combination is connected through a current-limiting inductor to a push-pull inverter loaded by way of an LC circuit parallel-resonant at about 30 kHz. A fluorescent lamp is connected in series with a current-limiting capacitor, and this lamp-capacitor series-combination is connected directly across the parallel-resonant LC circuit.

The inverter is of a type that can be triggered into and out-of oscillation. To obviate the requirement for an isolation transformer, a high-frequency ground-fault detection means is connected in circuit with the ballast output, and any excessive ground-fault current is used for triggering the inverter out of oscillation, thereby providing the requisite protection against electric shock hazard.

DESCRIPTION OF THE PREFERRED EMBODIMENT

DETAILS OF CONSTRUCTION

Figure 1:
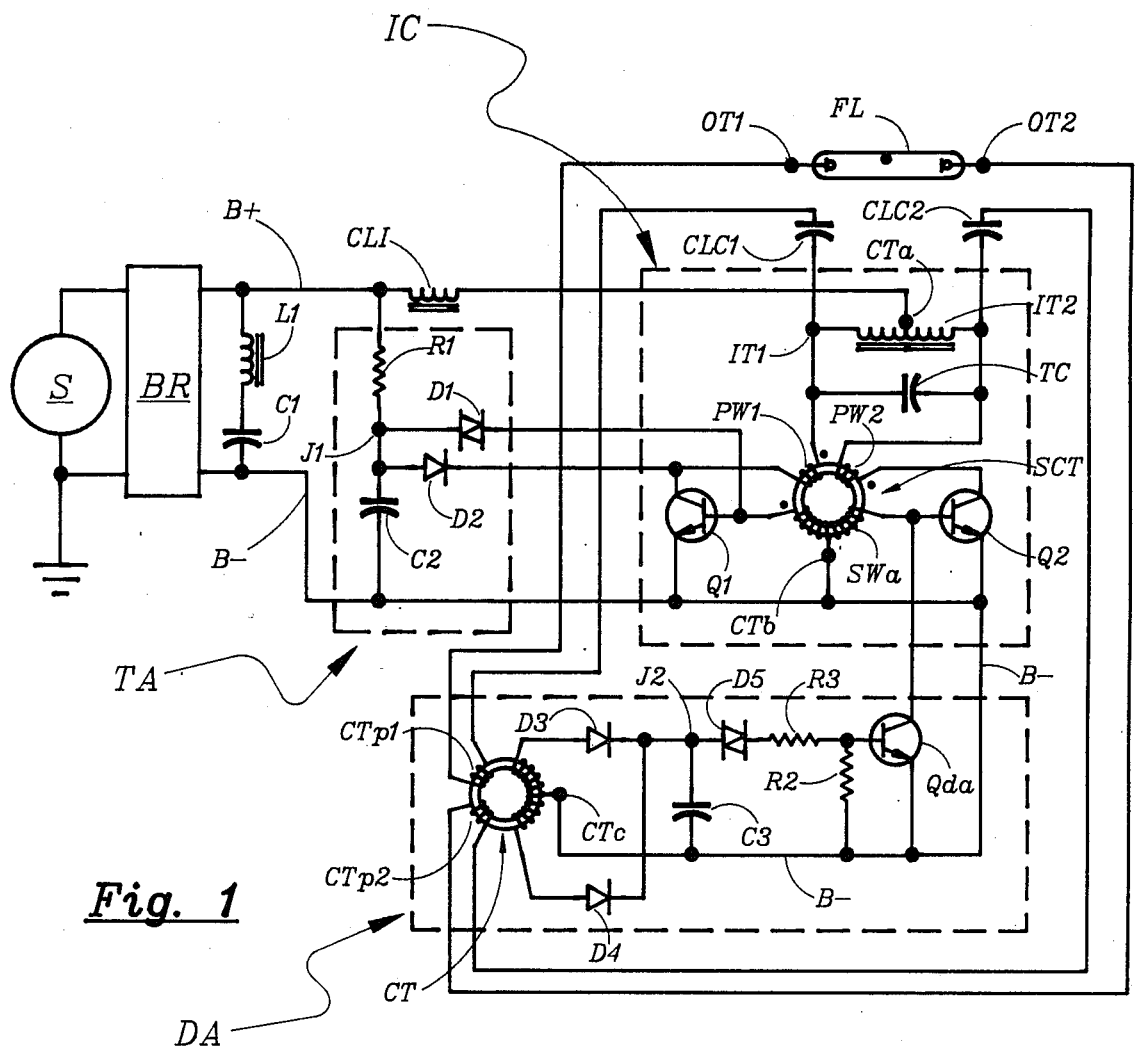
FIG. 1 shows a schematic circuit diagram of the preferred embodiment of subject electronic ballast.

In FIG. 1, a bridge rectifier BR is connected to an AC voltage source S, which is an ordinary 120 Volt/60 Hz power line. In parallel with the output of this bridge rectifier is connected a series-combination of an inductor L1 and a capacitor C1. This series-combination is substantially resonant at 120 Hz and thereby operates to eliminate the 120 Hz ripple voltage that otherwise would be present at the output a bridge rectifier powered from a 120 Volt/60 Hz power line.

The filtered DC voltage output from the bridge rectifier is applied to a B+ bus and a B− bus, and then to an inverter circuit IC by way of current-limiting inductor CLI. The inverter circuit comprises a parallel-tuned LC circuit consisting of a center-tapped tank inductor TI and a tank capacitor TC; which parallel-tuned LC circuit is resonant at about 30 kHz.

The inverter is made to self-oscillate through positive feedback provided to two push-pull-connected transistors Q1 and Q2 by way of saturable current transformer SCT. The inverter is triggered into self-oscillation by way of a trigger arrangement TA consisting of resistor R1, capacitor C2, Diac D1, and diode D2; and it may be stopped from oscillating by way of a disabling arrangement DA consisting of disabling transistor Qda, resistors R2 and R3, capacitor C3, diodes D3 and D4, Diac D5, and current transformer CT.

In inverter circuit IC: inductor TI has a center-tap CTa, a first inductor terminal IT1, and a second inductor terminal IT2; center-tap CTa is connected with the B+ bus by way of current-limiting inductor CLI; terminal IT1 is connected with the collector of transistor Q1 by way of first primary winding PW1 of transformer SCT; terminal IT2 is connected with the collector of transistor Q2 by way of second primary winding PW2 of transformer SCT; capacitor TC is connected directly between inductor terminals IT1 and IT2; and secondary winding SWa of transformer SCT, which secondary winding is connected directly between the bases of transistors Q1 and Q2, has a center-tap CTb connected directly with the B− bus and the emitters of both transistor Q1 and Q2.

In trigger arrangement TA: resistor R1 is connected between the B+ bus and a junction J1; capacitor C2 is connected between junction J1 and the B− bus; Diac D1 is connected between junction J1 and the base of transistor Q1; and diode D2 is connected between junction J1 and the collector of transistor Q1—the anode of diode D2 being connected with junction J1.

In disable arrangement DA: transistor Qda is connected with its collector to the base of transistor Q2 and with its emitter to the B− bus; resistor R2 is connected between the base and the emitter of transistor Qda; resistor R3 and Diac D5 are connected in series, and this series-combination is connected between the base of transistor Qda and a junction J2; capacitor C3 is connected between junction J2 and the B− bus; the cathodes of diodes D3 and D4 are both connected to junction J2; and the secondary winding of transformer CT, which has a center-tap CTc connected to the B− bus, is connected directly between the anodes of diodes D3 and D4.

Terminal TI1 is connected with one of the terminals of a current-limiting capacitor CLC1, the other terminal of which is connected with ballast output terminal OT1 by way of primary winding CTp1 of current transformer CT. Terminal TI2 is connected with one of the terminals of a current-limiting capacitor CLC2, the other terminal of which is connected with ballast output terminal OT2 by way of primary winding CTp2 of current transformer CT.

A fluorescent lamp FL is connected between output terminals OT1 and OT2; and a ground plane GP is positioned adjacent this fluorescent lamp.

DETAILS OF OPERATION

Figure 2:
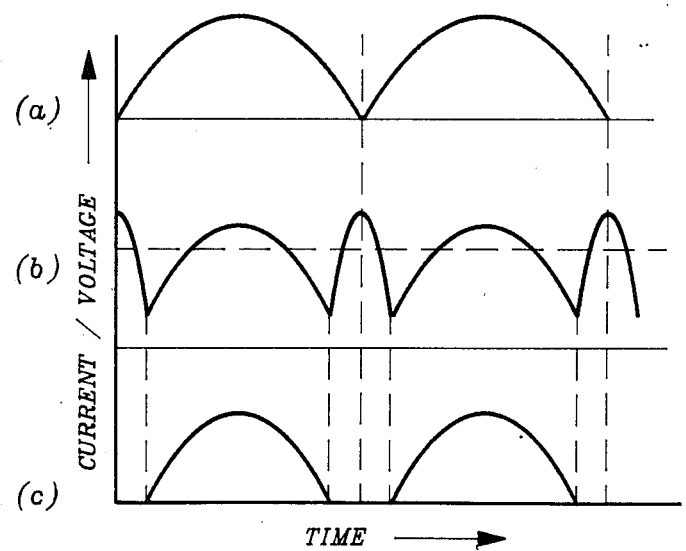
FIG. 2 shows various voltage/current waveforms associated with the operation of the circuit of FIG. 1.

The function of the LC series-resonant filter connected directly across the rectifier output is that of providing an effective short circuit for 120 Hz ripple voltage, the result of which is that of making the C voltage provided between the B− bus and the B+ bus appear as illustrated by FIG. 2b.

FIG. 2a shows the DC output voltage as it would have been without the LC series-resonant filter.

FIG. 2c shows the waveshape of the current drawn by the rectifier-filter combination from the power line, indicating an excellent power factor.

The basic operation of inverter circuit IC, including the function of current-limiting inductor CLI, is explained in prior art, such as: (i) as far as the operation of a push-pull inverter with a parallel-resonant output circuit is concerned, in U.S. Pat. No. 4,277,726 to Burke, and (ii) as far as using saturable current transformer means in the feedback circuit is concerned, in U.S. Pat. No. RE 31,758 to Nilssen.

The basic operation of trigger arrangement TA is also explained in U.S. Pat. No. RE 31,758 to Nilssen; and the basic operation of disable arrangement A is explained in U.S. Pat. No. 4,507,698 to Nilssen.

The overall operation of the ballast arrangement of FIG. 1 may be explained as follows.

(a) The DC voltage provided between the B− bus and the B+ bus is filtered by way of a series-resonant LC circuit tuned to the fundamental 120 Hz ripple-frequency, thereby avoiding the need to use an electrolytic capacitor.

(b) The powering of the fluorescent lamp is done without the aid of an isolation transformer. Instead, if a ground-fault current were to flow from one of the ballast output terminals (which might indeed result if a person in electrical connection with earth ground[i.e., in electrical connection with the power line] were to touch one of the output terminals, directly or indirectly), the result would be a net output of current from transformer CT; which output of current would be rectified by diodes D3 and D4 and applied to capacitor C3, thereby rapidly causing capacitor C3 to reach a voltage high enough to cause Diac D5 to break down; which, in turn, would cause transistor Qda to become an effective short circuit between the base and the emitter of transistor Q2, thereby disabling the inverter.

(c) An important point to recognize relates to the fact that, in electrical terms, the two output terminals OT1 and OT2 are each anti-symmetrically positioned with respect to ground. That is, with or without the lamp connected, any high-frequency leakage current flowing directly to ground from each output terminal (as by way of the ground plane located adjacent to the lamp) will be of identical magnitude but of opposite phase.

The presence of this kind of anti-symmetrical leakage current will contribute no net input Ampere-turns to current transformer CT. And, of course, the presence of lamp operating current will not contribute any net input Ampere-turns to current transformer CT either.

However, if there be more high-frequency current flowing from one of the output terminals than from the other, as would indeed occur in case of a ground-fault condition, a net input of Ampere-turns to current transformer CT would result; which net input would then cause capacitor C3 to charge, thereby after a few milliseconds causing the voltage magnitude on C3 to become large enough to cause Diac D3 to break down. When that occurs, capacitor C3 discharges itself into the base of transistor Qda; which transistor then in effect places a short circuit between the base and the emitter of transistor Q2, thereby stopping the inverter from oscillating and thusly removing the ground-fault current.

After a period of a second or so, the trigger arrangement will cause the inverter to re-start its oscillation. However, if the gound-fault condition still exists, the inverter will again be immediately disabled, etc.

In most cases it is not necessary that the two output terminals be exactly electrically anti-symmetrical; and in some cases it may not even be necessary to split the current-limiting capacitor means into two parts (i.e., CLC1 and CLC2).

(c) The use of a saturable current transformer in the positive feedback circuit permits the frequency of inverter operation to be substantially independent of the loading of the LC parallel circuit. For this to be the case, however, it is important that the length of the saturation time of this saturable transformer be longer than a half-cycle of the natural resonance frequency of the LC parallel-circuit. In other words, it is then important that the inversion frequency be somewhat lower than the natural resonance frequency of the LC parallel-circuit.

(d) The two halves of the center-tapped tank inductor TI are tightly coupled magnetically. Thus, the magnitude of the voltage on the Q1-collector, as well as that of the voltage on the Q2-collector, can not exceed twice the magnitude of the voltage present at center-tap CTa; which voltage, in turn, can not on the average exceed the magnitude of the voltage provided between the B− bus and the B+ bus. To prevent potentially destructive transient conditions , however, it would be prudent to connect a Zener diode between center-tap PTa and the B− bus.

(e) The fact that there is a current-limiting capacitor connected in series with both output terminals (namely CLC1 with OT1, and CLC2 with OT2), provides for effective electrical isolation between the output terminals and the power line as far as 60 Hz voltages are concerned.

(f) Current transformer CT is only sensitive to relatively high-frequency (i.e., 30 kHz or so) currents; and, due to the way the circuit is arranged, can not be subjected to currents at the power line frequency. Thus, the ground-fault protection arrangement is responsive to the high-frequency ballast output currents, but is non-responsive to currents at the power line frequency.

It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An electronic ballast adapted to connect with the AC voltage on an ordinary electric utility power line and to power a gas discharge lamp, said AC voltage being electrically referenced to ground, said ballast comprising:

full-wave rectifier means connected with said AC voltage and operable to provide a DC output across a pair of DC output terminals;

push-pull inverter means connected in series with an inductor means to form a series-combination, said series-combination being connected across said DC output terminals, said inverter means being operable to provide a current-limited substantially sinusoidal output voltage between a first output terminal and a second output terminal, the magnitude of the voltage existing between said first output terminal and ground being substantially equal to that of the voltage existing between said second output terminal and ground, the phasing of the voltage exisiting between said first terminal and ground being substantial equal and opposite with respect to the phasing of the voltage existing between said second terminal and ground, the frequency of said output voltage being substantially higher than that of said AC voltage;

connect means to permit connection of a gas discharge lamp across said output terminals; and safety means connected in circuit between said output terminals and said inverter means, and operable to cause substantial reduction in the magnitude of said output voltage in case the magnitude of current flowing out of said first output terminal is substantially different from that of the current flowing into said second output terminal, said safety means being non-responsive to any current flowing in the power lines.

2. The ballast of claim 1 wherein said safety means is responsive to currents of frequency equal to that of said output voltage but substantially non-responsive to currents of frequency equal to that of said AC voltage.

3. The ballast of claim 1 wherein said inverter must be triggered into operation in order to provide said output voltage.

4. The ballast of claim 3 wherein said inverter is operative to be triggered out of operation, thereby to remove said output voltage from said output terminals, and wherein said safety means is operative to trigger the inverter out of operation in order to cause said substantial reduction, where it is indeed triggered into operation a relatively short period after each time it has been triggered out of operation.

5. The ballast of claim 4 wherein the inverter is triggered into operation a brief period after each time it has been triggered out of operation.

6. The ballast of claim 1 combined with series-resonant means connected across said DC output terminals and operative to provide an effective short circuit for a voltage of frequency twice that of said AC voltage.

7. An electronic ballast adapted to connect with the AC voltage on an ordinary electric utility power line and to power a gas discharge lamp, said AC voltage being electrically referenced to ground, said ballast comprising:

full-wave rectifier means connected with said AC voltage and operable to provide a DC output across a pair of DC output terminals;

push-pull inverter means having a pair of switching transistors connected in circuit with a parallel-combination of an inductor means and a capacitor means, said inductor means having a center-tap, said inverter means being operable to provide between a first output terminal and a second output terminal a current-limited output voltage of frequency substantially higher than that of said AC voltage, the magnitude of the voltage existing between said first output terminal and said center-tap being substantially equal to that of the voltage existing between said second output terminal and said center-tap the phasing of the voltage existing between said first terminal and said center-tap being substantial equal and opposite with respect to the phasing of the voltage existing between said second terminal and said center-tap;

first connect means, including current-limiting inductor means, operative to connect said inverter means with said DC output terminals, whereby said center-tap becomes electrically connected with ground by way of said rectifier means;

second connect means operative to permit the connection of a gas discharge lamp between said first output terminal and said second output terminal; and disable means connected with said inverter means and, in response to currents flowing from said output terminals, operative to substantively reduce the magnitude of said output voltage in case the magnitude of the current flowing out of said first output terminal is substantively different from that of the current flowing into said second output terminal, said disable means being non-responsive to any current flowing in the power lines.

8. The ballast of claim 7 wherein said disable means is responsive to currents of frequency equal to that of said output voltage but is substantially non-responsive to currents of frequency equal to that of said AC voltage.

9. The ballast of claim 7 wherein the natural resonance frequency of said parallel-combination is higher than the frequency of said output voltage.

10. The ballast of claim 7 wherein an LC series-combination is connected between said pair of DC output terminals, said LC series-combination being series-resonant at a frequency approximately equal to twice that of said AC voltage.

11. The ballast of claim 7 wherein said current-limiting inductor means is operative to substantively reduce amplitude modulations on said output voltage in comparison to what these amplitude modulations would have been without said current-limiting inductor means.

12. An electronic ballast adapted to connect with the AC voltage on an ordinary electric utility power line and to power a gas discharge lamp, said AC voltage being electrically referenced to ground, said ballast comprising:
  rectifier and filter means connected with said AC voltage and operative to constitute a DC source having an inductive internal source impedance;
  push-pull inverter being connected with said DC source and having a pair of switching transistors connected in circuit with a parallel-combination of an inductor and a capacitor, said inverter being operable to provide between a first terminal and a second terminal a reactively current-limited output voltage of frequency substantially higher than that of said AC voltage, the magnitude of the voltage existing between said first terminal and ground being substantially equal to that of the voltage existing between said second terminal and ground, the phasing of the voltage existing between said first terminal and ground being sustantial equal and opposite with respect to the phasing of the voltage existing between said second terminal and ground;
  connect means operative to permit the connection of a gas discharge lamp between said first terminal and said second terminal; and
  disable means connected with said inverter means and, in response to currents flowing from said terminals, operative to substantively reduce the magnitude of said output voltage in case the magnitude of the current flowing out of said first terminal is substantively different from that of the current flowing into said second terminal.

13. The ballast of claim 12 wherein the magnitude of said internal source impedance is relatively large at the frequency of said output voltage, thereby effectively making said DC source a constant current source at that frequency.

* * * * *